United States Patent
Lao

(10) Patent No.: US 11,586,406 B2
(45) Date of Patent: Feb. 21, 2023

(54) PRINTING SYSTEM AND METHODS TO MANAGE PRINTING DEVICES ACCORDING TO INFORMATION FOR EACH PRINTING DEVICE

(71) Applicant: Kyocera Document Solutions Inc., Osaka (JP)

(72) Inventor: Katherine Bayquen Lao, Pacheco, CA (US)

(73) Assignee: Kyocera Document Solutions Inc., Osaka (JP)

( * ) Notice: Subject to any disclaimer, the term of this patent is extended or adjusted under 35 U.S.C. 154(b) by 0 days.

(21) Appl. No.: 17/154,572

(22) Filed: Jan. 21, 2021

(65) Prior Publication Data

US 2022/0229619 A1 Jul. 21, 2022

(51) Int. Cl.
*G06F 3/12* (2006.01)

(52) U.S. Cl.
CPC ............ *G06F 3/1296* (2013.01); *G06F 3/121* (2013.01); *G06F 3/1244* (2013.01)

(58) Field of Classification Search
None
See application file for complete search history.

(56) References Cited

U.S. PATENT DOCUMENTS

| 5,023,631 | A | 6/1991 | Negishi et al. |
| 5,740,028 | A | 4/1998 | Sugiyama et al. |
| 6,384,925 | B1 | 5/2002 | Fujiyoshi |
| 11,023,188 | B2 * | 6/2021 | Yamasaki ............ G06F 3/1211 |
| 2008/0012892 | A1 | 1/2008 | Imoto |
| 2017/0116503 | A1 * | 4/2017 | Kawabata ............ G06K 15/408 |

FOREIGN PATENT DOCUMENTS

| EP | 2827239 A1 * | 1/2015 | ........... G06F 3/1203 |
| JP | 2004280214 A | * 10/2004 | |

* cited by examiner

*Primary Examiner* — Fan Zhang
(74) *Attorney, Agent, or Firm* — Millen, White, Zelano & Branigan, P.C.; William Nixon

(57) ABSTRACT

A printing system manages printing devices. A managing server receives device update status information and pending job information from each of the printing devices. A status change for a component within a first printing device is detected, thereby updating the device information for the first printing device. The managing server parses a print job queue for the first printing device to update the pending job information to determine the print job will cause a first potential error related to the changed status of the first printing device. When a new print job is received, the managing server determines that the new print job will not occur according to the first potential error, identifies a second printing device, determines the new print job will not result in a second potential error at the second printing device, and sends the new print job to the second printing device.

20 Claims, 9 Drawing Sheets

Device Information 130

| | | |
|---|---|---|
| | Device ID | IP Address |
| 502 | Firmware Info | Firmware Version<br>Type of Firmware<br>Date of Installation |
| 504 | Error History | Error code Date of Occur<br>Error code Data of Occur<br>⋮ |
| 506 | Print Volume history | Print to Volume count<br>Date of Check |
| 508 | Paper trays Info. | Tray 1<br>Number (Percentage) of paper remaining:<br>Paper sizes:<br>Paper quality:<br>Cleaness levels:<br>Media type:<br>Paper jam:<br>...<br>Tray 2:<br>⋮ |
| 510 | Ink Toner Info. | Level remaining<br>Color<br>Plain |
| 512 | Warning | High priority warning<br>Medium priority warning<br>Low Priority warning |
| 514 | Error | Error<br>Potential Error |
| 516 | Printing jobs | Job No<br>Printing in progress<br>Incoming job<br>Suspended job .... |

Fig. 5

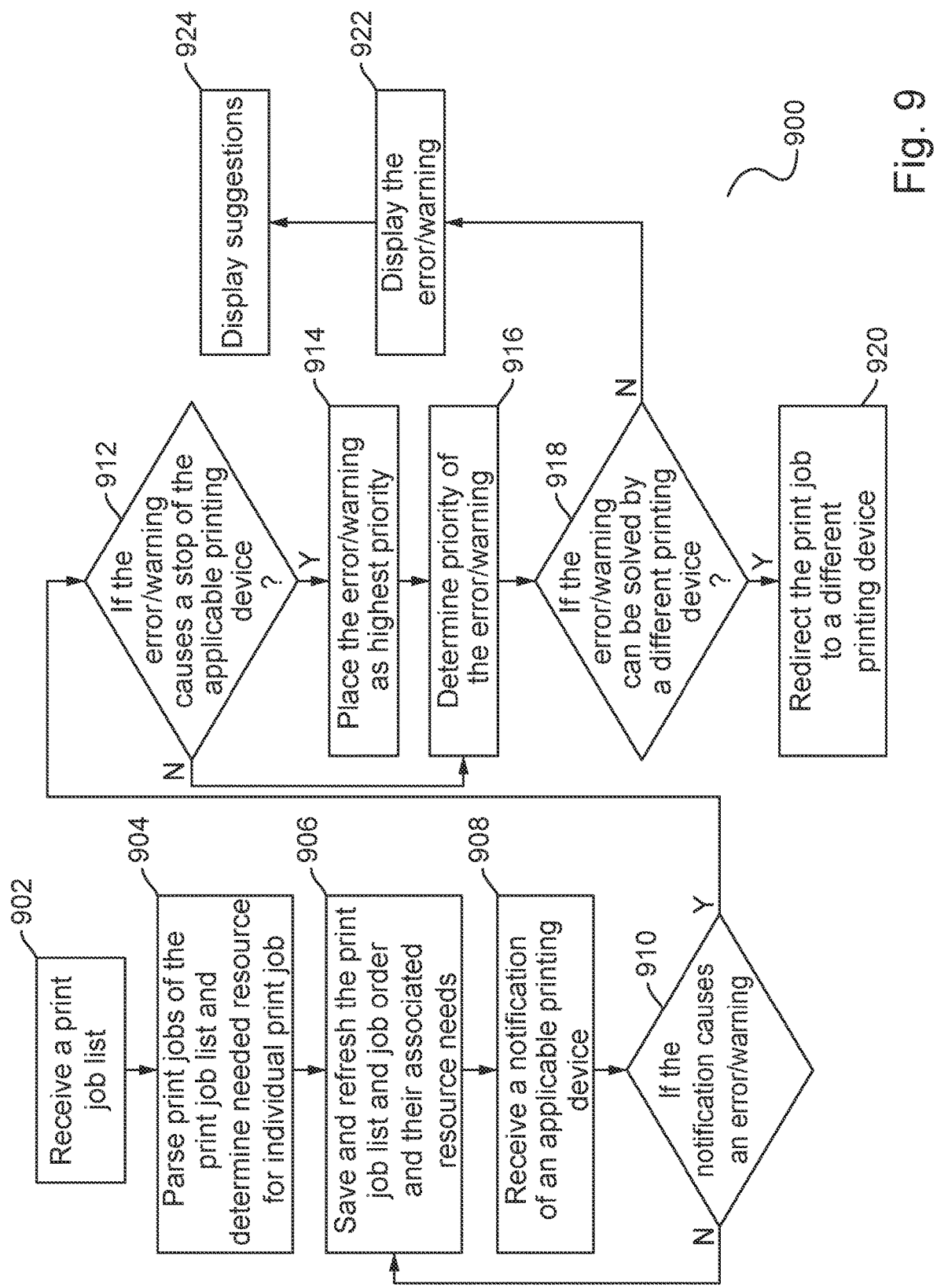

PRINTING SYSTEM AND METHODS TO MANAGE PRINTING DEVICES ACCORDING TO INFORMATION FOR EACH PRINTING DEVICE

FIELD OF THE INVENTION

The present invention relates to a system of printing devices that implements methods to manage print jobs to the printing devices using information specific to each printing device, such as error information and pending job information.

DESCRIPTION OF THE RELATED ART

When an error, such as an empty paper tray, occurs on a printing device, print operations are suspended for that device if it us feeding from that tray. Some systems may notify the error to the user so that the user can act on the error to resolve it. This reaction-type process creates additional down-time for the printing device. It also creates more wasted time for the user, especially in a print-heavy environment such as production printing, because the user reacts to the media-caused error created by the current print job. The user does not have the information or notification that future print jobs may cause similar or additional errors while addressing the current one.

SUMMARY OF THE INVENTION

A method for managing a plurality of printing devices within a printing system is disclosed. The method includes receiving device information for each of the plurality of printing devices, in which the device information includes status of components within each of the printing devices, subscribing to receive device update status information and pending job information from each of the plurality of printing devices, in which the device update status information and pending job information is stored with the device information for each of the plurality of printing devices, detecting a status change for one of the components within a first printing device of the plurality of printing devices, updating the device information for the first printing device, and parsing a print job queue for the first printing device to update the pending job information, in which at least one print job is in the print job queue will change a status of the first printing device. The method further includes determining the at least one print job will cause a first potential error related to the changed status of the first printing device, receiving a new print job for the printing system, determining that the new print job will not occur according to the first potential error at the first printing device based on the device information, device update status information, or pending job information of the first printing device, identifying a second printing device of the plurality of printing devices, determining the new print job will not result in a second potential error at the second printing device based on its device information, device update status information, and pending job information of the second printing device; and sending the new print job to the second printing device.

A method of managing print jobs using a plurality of printing devices is also disclosed. The method includes obtaining from each printing device of the plurality of printing devices at least the following information: job information about one or more print jobs pending at the printing device, error information about one or more errors on the printing device, warning information about one or more warnings on the printing device, and function information about one or more functions available at the printing device. Based on the obtained information, the method determines an error priority order of the plurality of printing devices based on the error information and the warning information, receives a print job of a document, wherein the print job specifies resources needed to complete printing of the document, determines that the resources for the print job will cause an error condition at one or more printing devices of the plurality of printing devices using the job information, updates the error priority order based on the error condition at the one or more printing devices, determines a printing device from the plurality of printing devices to receive the print job of the document according to the function information of each printing device and the error priority order, wherein the printing device processes the print job without causing the error condition, sends the print job to the printing device, and updates the job information for the printing device.

Further, a method for processing a print job for a document is disclosed. The method comprising querying a first printing device of a plurality of printing devices for first job information about at least one pending print job in a first print queue, first error information about at least one error on the first printing device, and first function information about at least one function available at the first printing device, and querying a second printing device of the plurality of printing devices for second job information about at least one pending print job in a second print queue, second error information about at least one error on the second printing device, and second function information about at least one function available at the second printing device. The method further includes analyzing the first error information and the second error information to prioritize the at least one error on each of the first and second printing devices, determining an error priority order between the first and second printing devices, receiving the print job of a document, wherein the print job specifies resources to complete printing of the document, determining whether the resources specified by the print job will cause a first potential error condition on the first printing device based on the first job information, determining whether the resources of the print job will cause a second potential error condition of the second printing device based on the second job information, updating the error priority order based on the first potential error condition and the second potential error condition caused by the print job, and sending the print job to one of the first printing device and the second printing device based on the error priority order and the function information for each printing device.

A method for resolving errors within a printing system is further disclosed. The method includes compiling error information about errors from a plurality of printing devices, compiling pending job information for pending print jobs at the plurality of printing devices, analyzing the error information about the errors from the plurality of printing devices, determining an error category for each of the errors based on the error information, applying weight parameters to each of the errors according to the respective error category, analyzing the pending job information for the pending print jobs at the plurality of printing devices to determine resources specified by each pending print job, indicating that the resources specified by each pending print job will result in a potential error at a printing device of the plurality of printing devices, applying the weight parameters to the potential error, and determining a priority order to resolve the errors and the potential error based on the weight parameters and the pending job information for the pending print jobs.

A further method for resolving errors at a printing device is also disclosed. The method includes compiling error information about a plurality of errors, compiling pending job information for pending print jobs at a print queue, analyzing the error information about the plurality of errors, determining an error category for each of the errors based on the error information, applying weight parameters to each of the errors according to the respective priority category, analyzing the pending job information for the pending print jobs to determine resources specified by each pending print job, indicating that the resources specified by each pending print job will result in a potential error within the printing device, applying the weight parameters to the potential error, and determining a priority order to resolve the errors and the potential error based on the weight parameters.

A print managing server for a printing system is also disclosed. The print management server includes a processor and a memory to store instructions executable on the processor. According to the embodiment, the instructions, when executed, configure the server to compile error information about errors from a plurality of printing devices, compile pending job information for pending print jobs at the plurality of printing devices, analyze the error information about the errors from the plurality of printing devices, determine an error category for each of the errors based on the error information, apply weight parameters to each of the errors according to the respective priority category, analyze the job information for the pending print jobs at the plurality of printing devices to determine resources for each pending print job, indicate that the resources for each pending print job will result in a potential error at the respective printing device, apply the weight parameters to the potential error, and determine a priority order to resolve the errors and the potential error based on the weight parameters and the job information for the pending print jobs.

BRIEF DESCRIPTION OF THE DRAWINGS

Various other features and attendant advantages of the present invention will be more fully appreciated when considered in conjunction with the accompanying drawings.

FIG. 5 illustrates a block diagram of an example entry for a printing device according to the disclosed embodiments.

FIG. 9 illustrates a flowchart of managing print jobs in accordance with the disclosed embodiments.

DETAILED DESCRIPTION OF THE PREFERRED EMBODIMENTS

Reference will now be made in detail to specific embodiments of the present invention. Examples of these embodiments are illustrated in the accompanying drawings. Numerous specific details are set forth in order to provide a thorough understanding of the present invention. While the embodiments will be described in conjunction with the drawings, it will be understood that the following description is not intended to limit the present invention to any one embodiment. On the contrary, the following description is intended to cover alternatives, modifications, and equivalents as may be included within the spirit and scope of the appended claims. Numerous specific details are set forth in order to provide a thorough understanding of the present invention.

The disclosed embodiments include a printing system that routes and re-routes based on availability and capabilities of the printing devices. A process just routing a job just as it is about to printed based on the determined capabilities of a printing device still may not address the proper management within a system. It lets the user react to the errors of the current print job without preparing the user for upcoming errors and warnings to minimize these problems from occurring.

Thus, the disclosed embodiments minimize the media-related errors that can happen by foreseeing which printing devices will need which paper sizes and media types based on queued print jobs and priority print order, if an order system also is in place. The disclosed embodiments also may use historical data indicating which printing devices can perform with less errors or paper jams for specific-type of print jobs. These features provide the user with useful information on which to act first to help in the efficiency of printing in a multiple device environment, or a printing system. For example, there may be a low paper warning or a no paper error already in place but these do not give an informed decision to operators or users on which warnings or errors to prioritize when working on multiple printing devices. The multiple printing devices may share similar errors and warnings. A low paper warning may be a higher priority notification than an empty tray error if there is a pending job or order that will be fed from the "low paper warning" tray than an empty tray with no pending print jobs.

Figure 1:
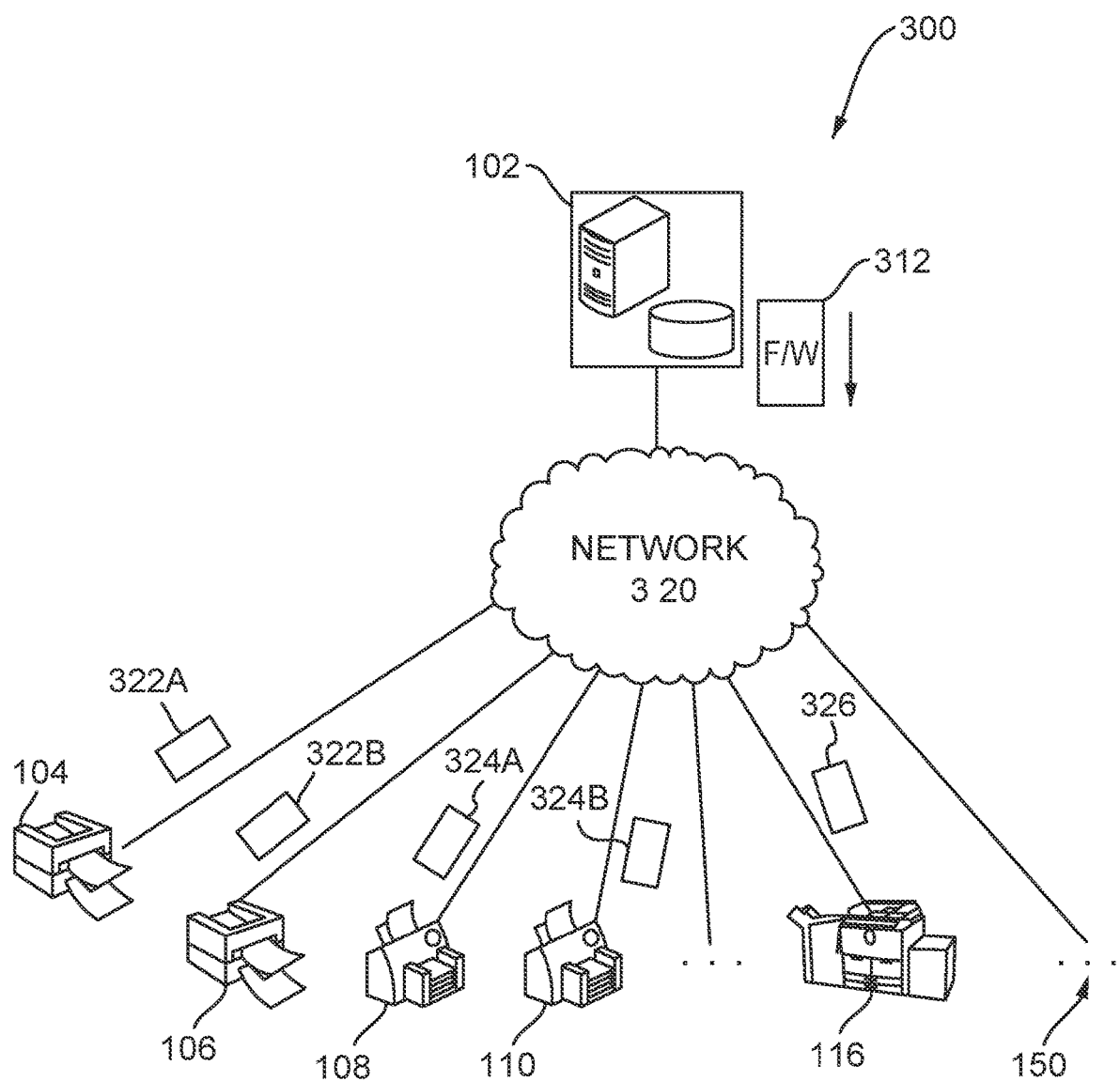
FIG. 1 illustrates a block diagram of a printing system of a plurality of printing devices for controlling and monitoring printing performances of the plurality of printing devices according to the disclosed embodiments.

FIG. 1 depicts a block diagram of a printing system 100 of a plurality of printing devices, such as printing devices 104-116 coupled to managing server 102 that monitors and updates statuses of the plurality of printing devices based on information received therefrom according to the disclosed embodiments. System 100 includes printing devices 104-116 and additional printing devices 150 connected to managing server 102 via network 320. Printing devices 104 and 106 may be similar device models, while printing devices 108 and 110 also may be similar device models that differ from printing devices 104 and 106. Printing device 116 may be a different model altogether. Additional printing devices may be associated with the different models. Further, system 100 may include additional models of printing devices not shown here for brevity.

A given printing device may be configured to perform one or more functions such as printing, scanning, emailing, storing, modifying, receiving, or transmitting one or more documents or files. In some embodiments, each printing device may include hardware and software components associated with a firmware package. Firmware may refer to packages of software installed on embedded devices. Each firmware may include a version for the different packages for the components within the printing device. A version of firmware, or firmware 312, may be sent from managing server 102 to one or more printing devices within system 100.

Each printing device 104, 106, 108, 110, . . . , 116, and 150 may be configured to perform one or more steps, actions, or functions disclosed herein. For example, printing device 104 may communicate with managing server 102 to transmit or receive data, or information, 322A via network 320, including error codes, print counter values, time stamps, error intervals, mean time between failures (MTBF), error frequency codes, time intervals, numbers of printed pages, numbers of errors, print volume, remaining numbers or percentage of papers in paper cassettes, paper sizes in paper cassettes, toner levels, and other related information. Each printing device may send and receive its own data packages, as shown in FIG. 1. Data may be routed within system 100 using a protocol, such TCP/IP, in that each device includes its own unique network address. Thus, printing device 106 may transmit or receive data 322B, printing device 108 may transmit or receive data 324A, printing device 104B may transmit or receive data 324B, printing device 116 may transmit or receive data 326, and so on.

Managing server 102 may include a cloud-based server, for example, that can perform one or more tasks to manage or maintain printing devices within system 100. Managing server 102 may communicate with printing devices 104, 106, 108, 110, 116, and 150 to transmit and receive data. Managing server 102 also may install firmware 312 on one or more of the printing devices. In some embodiments, managing server 102 may transmit a command to one or more of the printing devices to reset, install updates, or perform one or more printing or maintenance functions or operations. In other embodiments, managing server 102 may receive data from one or more printing devices, shown as data 322A-326, such as error codes, print counter values, time stamps, error intervals, mean time between failures (MTBF), error frequency codes, time intervals, numbers of printed pages, remaining papers and paper sizes stored in paper cassettes, numbers of errors, print volume, and other related information.

Managing server 102 may be configured to perform one or more functions to determine whether to upgrade one or more printing devices with firmware 312. Firmware 312 may represent a version of firmware that may be used to replace one or more firmware packages on a set of printing devices. For example, firmware 312 may be used to upgrade every printing device in system 100 or only a group of printing devices, such as devices 104 and 106 having the same model. Managing server 102 performs the analysis of incoming data from the printing devices to determine whether to upgrade them with firmware 312. As noted above, firmware 312 may be a firmware package corresponding to only a part of the printing device, such as main, network, or image processing. Failure rates and other information provided by the printing devices determines how or if the upgrade to firmware 312 will be sent or installed.

Managing server 102 may include one or more computing devices or systems. It also may be consolidated into a single physical location or distributed across two or more physical locations. Managing server 102 may include hardware, software, or firmware configured to perform one or more functions disclosed below. Managing server 102 is disclosed in greater detail by FIG. 4.

Network 320 in system 100 may include one or more wired or wireless connections that support communication between the devices of system 100. In some embodiments, network 320 may support one or more communication protocols, such as Extensible Messaging and Presence Protocol (XMPP), File Transfer Protocol (FTP), HyperText Transport Protocol (HTTP), Java Message Service (JMS), Simple Object Access Protocol (SOAP), Short Message Service (SMS), Simple Mail Transfer Protocol (SMTP), Simple Network Management Protocol (SNMP), Transmission Control Protocol/Internet Protocol (TCP/IP), User Datagram Protocol (UDP), Lightweight Directory Access Protocol (LDAP), and the Message Queue (MQ) family of network protocols.

Network 320 is configured to allow communication between managing server 102 and one or more printing devices within system 100, between the printing devices themselves, or between one or more other devices or systems and system 100. Such communications may include commands, requests, or data corresponding to documents, printing-device errors, or other data.

Figure 2:
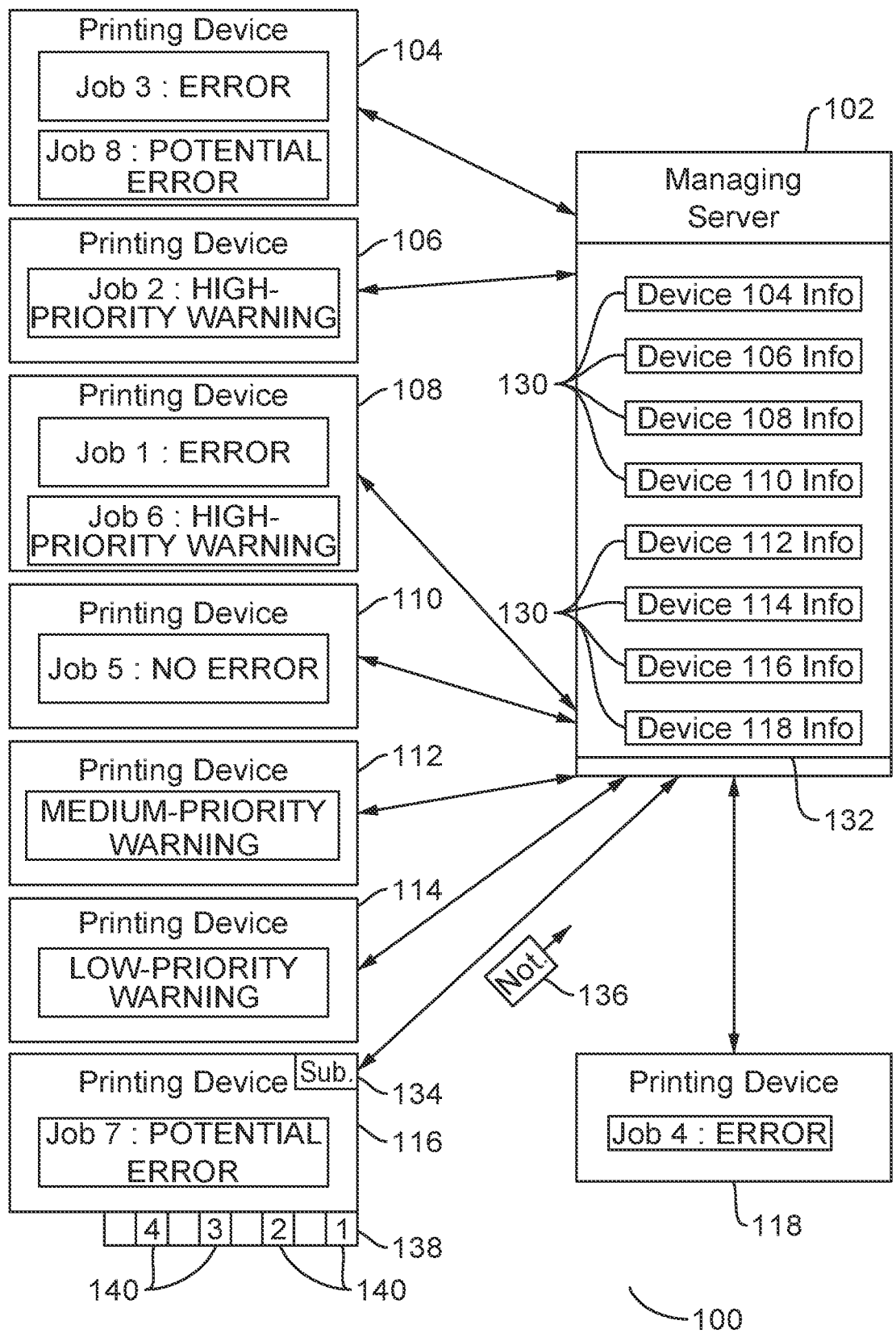
FIG. 2 illustrates a block diagram of a printing system of a plurality of printing devices using a managing server to control and monitoring printing performances of the plurality of printing devices according to the disclosed embodiments.

More details of printing system 100 of FIG. 1 are depicted in FIG. 2. In FIG. 2, only printing devices 104, 106, 108, 110, 112, 114, 116, and 118 are illustrated in printing system 100. Additional printing devices may be included in printing system 100. Alternatively, fewer printing devices may be utilized. As described above with reference to FIG. 1, printing devices 104-118 are connected over a network within system 100 to a printing system managing server 102. Managing server 102 may store information and data pertaining to the different printing devices. Managing server 102 also may collect this information and make decisions regarding the workflow and error priority of the printing device in system 100. An exemplary printing device is disclosed in a greater detail by FIG. 3. Managing server 102 is disclosed in greater detail in FIG. 4.

The disclosed embodiments aim to prevent or minimize the down time of the printing devices 104-118 by helping users of printing system 100 to plan ahead for the immediate paper size and media type needed for current and queued print jobs. Printing system 100, using managing server 102 or another device, may query all the managed printing devices for paper cassette statuses and other job halting errors. It also may subscribe to status changes for the paper cassettes and device errors. Printing system 100 may gather information on pending print jobs for each printing device, such as paper sizes used, number of pages in the pending print jobs, number of copies, media types used, and the like. Printing system 100 also may gather information on pending job orders not yet started to be printed. It also may gather historical, or data analyses, information, such as paper sizes and media types used whether for printing or waste-like jams, time to replenish paper cassettes, time to consume toner, cleaning fluid, and the like, time for a waste bottle to be replaced, and the like. The disclosed embodiments may determine and give weight to each error or warning event that would dictate the priority of the error or warning as well as displaying a prioritized list to users.

When multiple errors or warnings are detected from multiple printing devices, printing system 100 may utilize all the gathered information disclosed above to prioritize the errors and warnings accordingly. Printing system 100 also may notify the user of the priority so each one can be addressed efficiently. It will prioritize the errors and warnings according to active pending print jobs but printing system 100 also can consider delivery dates of pending job orders not yet started to be printed. Alternatively, it may prioritize based on the time it takes to resolve any errors or warnings. Printing system 100 also may anticipate low paper or empty cassette warnings based on queued print jobs or pending print job orders. Printing system 100 also may notify or suggest to users to reload or the change unused cassettes to feed needed paper sizes or media types based on demand so that a printing device may process print jobs with no or little interruption. Because printing system 100 is subscribing to changes in printing device status, prioritized lists of errors or warnings are updated on the fly, or in real-time.

These features may be implemented in managing server 102. Managing server 102 may communicate with the various printing devices to collect such information in order to provide management of print jobs within printing system 100 according the disclosed embodiments. The information collected from various printing devices may be stored as an entry for each printing device, such as entry 130 shown in FIG. 1, which will be described in greater detail in FIG. 5. In other embodiments, printing system 100 may not include a server but, instead, perform the process disclosed herein at one or more printing devices within the system. As disclosed below, printing system 100 and managing server 102 are described interchangeably performing functions and processes to manage printing devices 104-118.

Print jobs may be received by printing system 100. In some embodiments, managing server 102 may determine which printing device receives each print job. For example, managing server 102 may determine that printing device 104 does not receive every print job received in the printing system. Further, a print job may specify a certain type of paper or media type that is only available on certain printing devices. For example, a print job may require the use of A4 sized paper, which is only available on printing device 106 and 116. Thus, it would make no sense to send this print job to printing device 108, which only processes print jobs using letter sized paper.

In addition to managing print jobs based on capabilities of the printing device, the disclosed embodiments also manage print jobs according to device status information, pending job information, error information, warning information, and historical information from each of the printing devices within printing system 100. These features are disclosed in greater detail below. Managing server 102 may store this information for each printing device as data entries 130 in a database.

For example, there may be an entry 130 for information for printing device 104, an entry 130 for information for printing device 106, an entry 130 for information for printing device 108, and so on. Printing system 100 may retrieve relevant information from the printing devices being managed. This information includes information about the printing device and information about the jobs being processed in the printing device. Device information may include information such as paper cassette statuses, ink level status, cleaning media types set per cassette, media sizes per cassette, cleaning fluid, waste bottle levels, paper jams, device system errors, output bin statuses, stapler status, and the like. Printing system 100 also may retrieve pending print job status information from each printing device liking printing in progress, incoming print job(s), suspended print job(s), user input required, and the like.

Printing system 100 may establish a subscription 134 on each printing device for device and print job statuses. Subscription 134 is shown in printing device 116 but also may be available on the other printing devices in system 100. Subscription 134 may provide updates and information to managing server 102. When a status change occurs for the printing device or print jobs, the applicable printing device sends a notification 136 to printing system 100. For example, referring to printing device 116, the status of paper cassette 1 may change from low paper to empty cassette. Printing device 116 sends notification 136 to this effect. Printing system 100 may evaluate notification 136 and save the current information in entry 130 for information for printing device 116 on managing server 102. Printing system 100 also may create historical data for printing device 116 that will be used for data analytics. When notification 136 received from a printing device indicates a device error or status that caused the device to stop printing, printing system 100 may escalate this notification as a highest priority error.

Printing system 100, using managing server 102, may parse print jobs 140 in print queue 138 for a printing device. Referring back to printing device 116, print queue 138 is shown with four (4) pending print jobs 140. Print jobs 140 may include print job 1, print job 2, print job 3, and print job 4. The disclosed embodiments may parse print jobs 140 for job settings such as a number of copies, paper sizes, media types, number of pages, duplex, Nup, booklet, staple, and the like. For example, if duplex is set, then the number of media sheets needed are computed from the number of pages divided by 2 for front-sheet printing and back-sheet printing. This feature determined the needed resources per queued print job.

The disclosed embodiments also may determine if resources needed by a queued print job, such as print job 1 of print jobs 140 for printing device 116, will cause the printing device to stop printing given the current device status, such as paper level, ink level, media type, sizes loaded in the cassettes, and the like. Printing operations may stop due to inadequate paper resources or other resources such as staples, ink, space in the output bit, and the like. This determination may be performed for all pending print jobs 140 in print queue 138. The evaluation of a particular queued print job may take into account resources that will be consumed by all ahead-of-the-line queued print jobs 140 to foresee if it will cause an error. When a new status update is received from a printing device, the list of pending print jobs or orders, which has information already on their needed resources, may be reevaluated to determine if the new status will cause an error or a warning.

The disclosed embodiments also determine the overall priority of errors or warnings on printing devices within printing system 100. If queued print jobs 140 will cause an error or warning, the priority of the new error or warning also is determined. The priority of error or warnings may rank these items using the error categories disclosed below. These error categories may differ between printing systems. Printing system 100 may determine a priority of errors and warnings across all printing devices as well as within each printing device. Thus, printing system 100 may analyze print queues 138 on all printing devices as well as the one on printing device 116. The errors and warnings also may be prioritized based on print job order. In a preferred embodiment, the errors and warnings may be sent to managing server 102 and saved in respective device information entries 130.

There are several categories of the priority problems according to the preferred embodiments. The highest priority problems may be referred to as ERRORS. ERRORS include print-halting errors and statuses that require immediate user attention for printing operations to proceed. Such errors include paper jams, empty paper cassettes, missing output cassettes, open device cover or door, user input is required on the printing device, and the like. The information for these problems is retrieved from the printing device or automatically sent by the printing device to printing system 100 or managing server 102 when processing a current print job. Preferably, subscription 134 is provided on the printing device to enable the automatic reporting of an ERROR when it occurs.

Potential print-halting errors may be the second highest priority. This correlates the print jobs resource demand versus the printing devices resource supply. These problems may be referred to as POTENTIAL ERRORS. When queued print job N, such as print job 1, 2, 3, or 4 in print queue 138 of printing device 116, definitely cannot be printed with the current resources from the printing devices, it will have POTENTIAL ERROR priority N. For example, the problem may relate to missing paper size, missing media type, and the like. For the same case queued print job N+1, it will be POTENTIAL ERROR priority N+1, and so on.

The following example referring to printing device 116 may be illustrative. For estimated statuses like the amount of paper available in percentage, an error threshold is set to determine when this status is considered an error. Information for the capacity per paper feeder may be retrieved from printing device 116 and stored as an entry 130 at managing server 102. Using the example, a cassette sends a 50% paper available status for a 500-sheet paper cassette, which equates to approximately 250 sheets left on the cassette. An error threshold may be set to 20%, which indicates printing device 116 can print 20% more than the estimated sheets left before it can be considered an error due to an empty cassette. Thus, if a print job needs 300 sheets or more, then it is considered a POTENTIAL ERROR based on the information indicating 50% available paper and a 20% error threshold.

Third highest priority problems may be referred to HIGH-PRIORITY WARNINGS. This situation occurs when a queued print job can potentially cause a print-halting error. A warning threshold is set to determine when it is considered to a cause a print-halting error. As disclosed above, some statuses or warnings from a printing device may just be estimates. For example, a cassette sends out a low paper warning status. Such a status may be defined as having about 20% left of the relevant paper. For a 500-sheet paper cassette having a low paper warning, or 20% left, the paper cassette has about 100 sheets left on its cassette. If the warning threshold is set to 20%, then 80 sheets or less is considered "safe" from printing on a cassette with a low paper status. If one or more print jobs need more than 80 sheets to be printed, then this situation may be considered a HIGH-PRIORITY WARNING.

Fourth highest priority problems may be referred to as MEDIUM-PRIORITY WARNINGS. These may be device errors that have no relations with queued print jobs. For example, empty cassette errors with no print job needing to feed from that cassette may be MEDIUM-PRIORITY WARNINGS. As soon as print jobs are lined up for that printing device and needs the empty cassette, the priority escalates to either a HIGH-PRIORITY WARNING or a POTENTIAL ERROR.

Fifth priority problems on the priority list may be referred as LOW-PRIORITY WARNINGS. As same as the fourth priority problems, the fifth priority problems are not relative to the queued print jobs and can be device warnings, such as low paper but no lined up jobs, low toner, etc. As soon as print jobs are lined up for that printing device and needs more papers than what it has, the priority escalates to either a HIGH-PRIORITY WARNING or a POTENTIAL ERROR.

Examples for managing the queued print jobs based on the priority levels will be described in detail below with reference to FIGS. 5-9.

Figure 3:
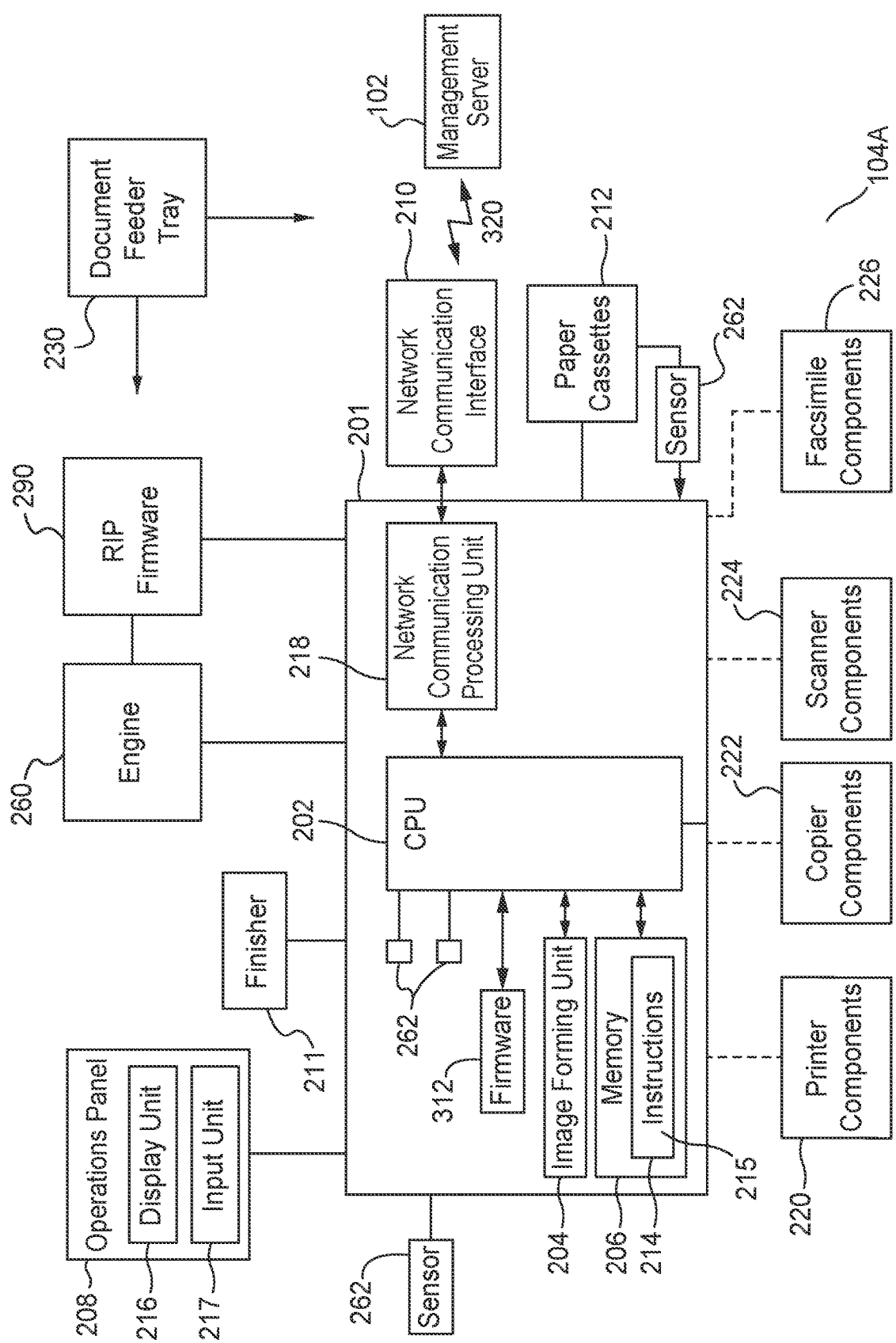
FIG. 3 illustrates a block diagram of components of a printing device according to the disclosed embodiments.

FIG. 3 depicts a block diagram of components of a printing device according to the disclosed embodiments. In the disclosure of FIG. 3, printing device 104 may be referred to for illustrative purposes. The architecture shown in FIG. 3 may apply to any multi-functional printing device or image forming apparatus that performs various functions, such as printing, scanning, storing, copying, and the like within printing system 100. As disclosed above, printing device 104 may send and receive data from managing server 102 and other devices within system 100.

Printing device 104 includes a computing platform 201 that performs operations to support these functions. Computing platform 201 includes a computer processing unit (CPU) 202, an image forming unit 204, a memory unit 206, and a network communication interface 210. Other components may be included but are not shown for brevity. Printing device 104A, using computing platform 201, may be configured to perform various operations, such as scanning, copying, printing, receiving or sending a facsimile, or document processing. As such, printing device 104 may be a printing device or a multi-function peripheral including a scanner, and one or more functions of a copier, a facsimile device, and a printer. To provide these functions, printing device 104 includes printer components 220 to perform printing operations, copier components 222 to perform copying operations, scanner components 224 to perform scanning operations, and facsimile components 226 to receive and send facsimile documents. CPU 202 may issue instructions to these components to perform the desired operations.

Printing device 104 also includes a finisher 211 and one or more paper cassettes 212. Finisher 211 includes rotatable downstream rollers to move papers with an image formed surface after the desired operation to a cassette. Finisher 211 also may perform additional actions, such as sorting the finished papers, binding sheets of papers with staples, doubling, creasing, punching holes, folding, and the like. Paper cassettes 212 supply paper to image the various components 220, 222, 224, and 226 to create the image formed surfaces on the papers. Paper cassettes 212 may include papers having various sizes, colors, composition, and the like. Paper cassettes 212 may be removed to refill as needed.

Document processor input feeder cassette 230 may be the physical components of printing device 104 to receive papers and documents to be processed. A document is placed on or in document processor input feeder cassette 230, which moves the document to other components within printing device 104. The movement of the document from document processor input feeder cassette 230 may be controlled by the instructions input by the user. For example, the document may move to a scanner flatbed for scanning operations. Thus, document processor input feeder cassette 230 provides the document to scanner components 220. As shown in FIG. 2, document processor input feeder cassette 230 may interact with engine firmware 260 to perform the desired operations.

Memory unit 206 includes memory storage locations 214 to store instructions 215. Instructions 215 are executable on CPU 202 or other processors associated with printing device 104, such as any processors within components 220, 222, 224, or 226. Memory unit 206 also may store information for various programs and applications, as well as data specific to printing device 104. For example, a storage location 214 may include data for running an operating system executed by computing platform 201 to support the components within printing device 104. According to the disclosed embodiments, memory unit 206 may store the tokens and codes used in performing the deferral operations for printing device 104.

Memory unit 206 may comprise volatile and non-volatile memory. Volatile memory may include random access memory (RAM). Examples of non-volatile memory may include read-only memory (ROM), flash memory, electrically erasable programmable read-only memory (EEPROM), digital tape, a hard disk drive (HDD), or a solid-state drive (SSD). Memory unit 206 also includes any combination of readable or writable volatile memories or non-volatile memories, along with other possible memory devices.

Computing platform 201 may host one or more processors, such as CPU 202. These processors are capable of executing instructions 215 stored at one or more storage locations 214. By executing these instructions, the processors cause printing device 104 to perform various operations. The processors also may incorporate processing units for specific purposes, such as application-specific integrated circuits (ASICs) and field programmable gate arrays (FPGAs). Other processors may be included for executing operations particular to components 220, 222, 224, and 226. In other words, the particular processors may cause printing device 104 to act as a printer, copier, scanner, and a facsimile device.

Printing device 104 also includes an operations panel 208, which may be connected to computing platform 201. Operations panel 208 may include a display unit 216 and an input unit 217 for facilitating interaction with a user to provide commands to printing device 104. Display unit 216 may be any electronic video display, such as a liquid crystal display (LCD). Input unit 217 may include any combination of devices that allow users to input information into operations panel 208, such as buttons, a touch screen, a keyboard or keypad, switches, dials, and the like. Preferably, input unit 217 includes a touch-screen digitizer overlaid onto display unit 216 that senses touch to receive inputs from the user. By this manner, the user interacts with display unit 216. Using these components, one may enter codes or other information into printing device 104.

Printing device 104 also includes network communication processing unit 218. Network communication processing unit 218 may establish a network communication using a network, such as a wireless or wired connection with one or more other image forming apparatuses or managing server 102. CPU 202 may instruct network communication processing unit 218 to transmit or retrieve information over a network using network communication interface 210. As data is received at computing platform 201 over a network, network communication processing unit 218 decodes the incoming packets and delivers them to CPU 202. CPU 202 may act accordingly by causing operations to occur on printing device 104. CPU 202 also may retrieve information stored in memory unit 206, such as settings for printing device 104.

Printing device 104 also includes engine 260. Engine 260 may be a combination of hardware, firmware, or software components that act accordingly to accomplish a task. For example, engine 260 is comprised of the components and software to print a document. It may receive instructions from computing platform 201 after user input via operations panel 208. Alternatively, engine 260 may receive instructions from other attached or linked devices.

Engine 260 manages and operates the low-level mechanism of the printing device engine, such as hardware components that actuate placement of toner onto paper. Engine 260 may manage and coordinate the half-toner, toner cartridges, rollers, schedulers, storage, input/output operations, and the like. Raster image processor (RIP) firmware 290 that interprets the page description languages (PDLs) would transmit and send instructions down to the lower-level engine 260 for actual rendering of an image and application of the toner onto paper during operations on printing device 104.

In some embodiments, managing server 102 may send updates to firmware on printing device 104. Thus, engine 260 or RIP firmware 290 may be updated by a firmware, for example, firmware 312 shown in FIG. 3, which is a more recent version of the firmware installed on printing device 104. The installation of the new firmware version, however, may result in additional errors or degradation of performance of printing device 104. In this instance, printing device 104 may not install firmware 312.

To this end, printing device 104 may include one or more sensors 262 (only four are shown in the figure for brevity) that collect data and information to provide to computing platform 201 or CPU 202. Each sensor 262 may be used to monitor certain operating conditions of printing device 104. Sensors 262 may be used to indicate a location of a paper jam, failure of hardware or software components, broken parts, operating system problems, document miss-feed, toner level, number of papers remained in the paper cassettes, as well as other operating conditions. Sensors 262 also may detect the number of pages printed or processed by printing device 104. When a sensor 262 detects an operational issue or failure event, it may send a signal to CPU 202. CPU 202 may generate an error alert associated with the problem. The error alert may include an error code. Computing platform 201 may transmit the error alert along with the error code to managing server 102. Further, sensors 262 may detect the paper size, a percentage of paper remained, a toner level and so on, and send the detection results to computing platform 201. Computing platform 201 in turns sends the results to managing server 102 upon request or automatically.

Display unit 216 may display information about applicable error codes and a short description of the error associated with the operational issue or failure event. Further, display unit 216 may display an instruction on how to proceed (operate) to resolve the error. For example, if a network error occurred, then the following message may be provided on operations panel 208: Reboot the device.

Some errors have hardware-related causes. For example, if a failure occurred in finisher 211, such as a paper jam, display unit 216 may display information about the error and the location of the failure event, or the finisher. In the instance when the paper jam occurs in paper cassettes 212, display unit 216 displays the information about the jam error as located in one of the paper cassettes.

Some errors have a type of firmware-related cause. For example, network communication processing unit 218 may cause a firmware or software error. Display unit 216 may display the firmware-related error, any applicable error codes, and provide recommendations to address the error, such as reboot the device.

Memory unit 206 may store the history of failure events and occurred errors with a timestamp of each error. The history of failure events may be sent via network communication interface 210 to managing server 102 for statistical purpose. Printing device 104 communicates with managing server 102 via network communication interface 210 by utilizing a network protocol. In some embodiments, printing device 104 communicates with managing server 102 through REST API, which allows the server to collect data from multiple devices via network 320 (shown in FIG. 3). REST API and SOAP are application protocols used to submit data in different formats, such as files, XML messages, JSON messages, and the like. By utilizing applicable network communication protocols and application protocols, printing device 104 submits the applicable error code or codes to managing server 102. Managing server 102 collects error codes and data from individual devices, stores information in the database for further analysis, and creates information data entries (e.g., 130 of FIG. 1) for individual printing devices. The data stored in the database includes device identification, timestamp, error code, remaining number or percentage of papers, paper size, and the like.

According to preferred embodiments of the present invention, after analyzing the collected information from individual printing devices, managing server 102 distributes different printing jobs received from a network to different printing devices based on the collected information, and re-directs printing jobs to a different printing device when detecting an error or warning from an assigned printing device. The details of managing server 102 will be described in detail below with reference to FIGS. 3-4.

Figure 4:
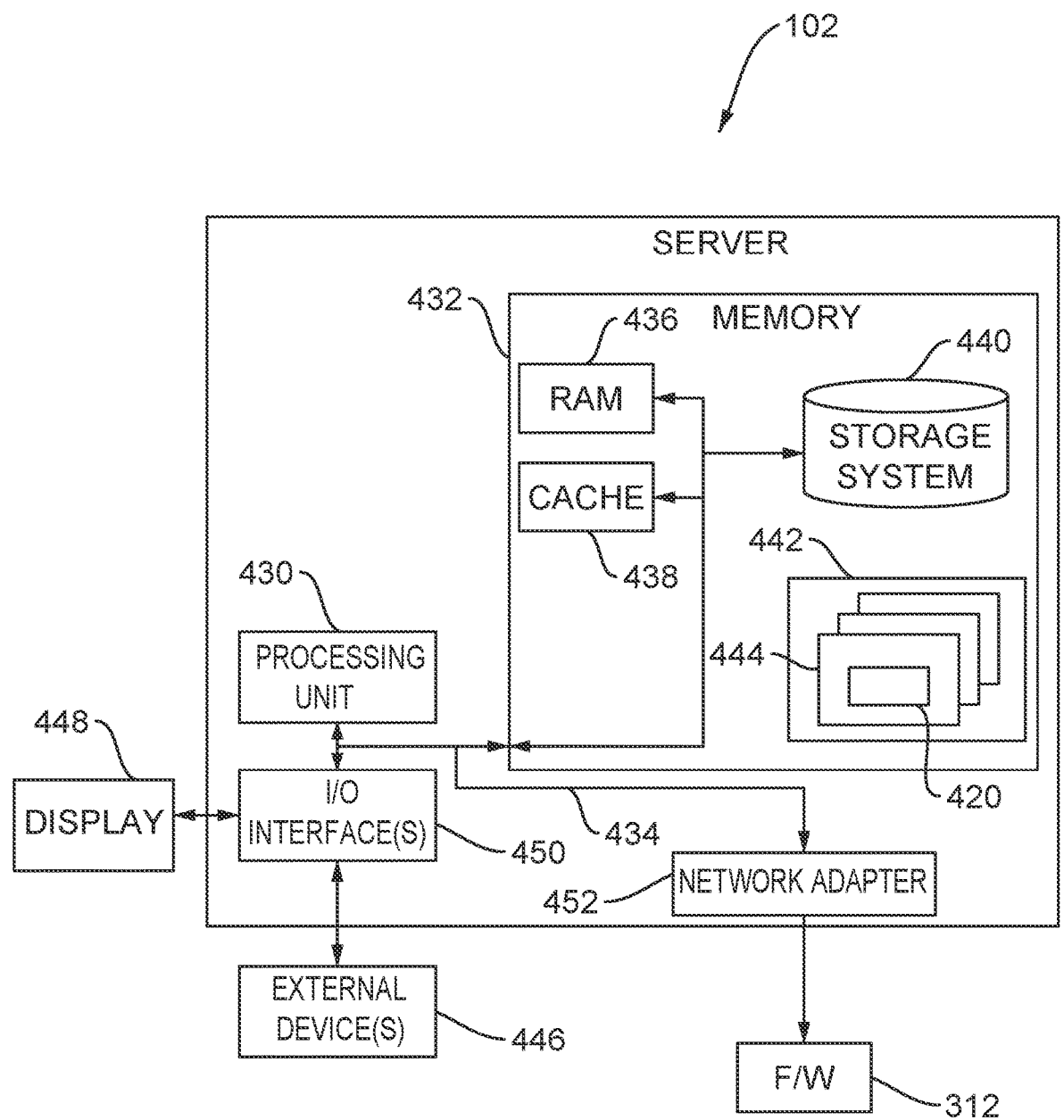
FIG. 4 illustrates a block diagram of a managing server according to the disclosed embodiments.

FIG. 4 depicts a block diagram of managing server 102 according to the disclosed embodiments. The components of managing server 102 may include, but are not limited to, one or more processors or processing units 430 and a server memory 432. A server bus 434 couples various server components including server memory 432 to processor 430. Managing server 102 may include a variety of computer readable media. Such media may be selected from any available media that is accessible by managing server 102, including non-transitory, volatile, and non-volatile media, removable and non-removable media. Server memory 432 could include one or more personal computing readable media in the form of volatile memory, such as random access memory (RAM) 436 or a cache memory 438. In some embodiments, a storage system 440 may be provided for reading from and writing to a non-removable, non-volatile magnetic media device, such as a hard drive.

Server memory 432 may include at least one program product or utility 442 having a set, or at least one, of program modules 444 that may be configured to perform the functions of the disclosed embodiments. Program modules 444 may include, but are not limited to, an operating system, one or more application programs, other program modules, and program data. Each of the operating systems, one or more application programs, other program modules, and program data or some combination thereof, may include an implementation of a networking environment. Program modules 444 may perform the functions or methodologies of embodiments of the invention as disclosed herein. For example, a program module 444 in managing server 102 may be configured to determine if components of one of the printing devices of system 100 needs to be replaced or fixed due to a failure event, error, or warning within the device.

Managing server 102 may communicate with one or more external devices 446, such as a keyboard, a pointing device, a stylus, a display 448, or any similar devices, such as a network card, modem, and the like. Display 448 may be a light emitting diode (LED) display, a liquid crystal display (LCD) display, a cathode ray tube (CRT) display, and the like. External devices 446 may enable managing server 102 to communicate with a printing device. Such communication may occur via input/output (I/O) interfaces 450. Alternatively, managing server 102 may communicate with one or more networks such as a local area network (LAN), a general wide area network (WAN), or a public network via a network adapter 452. Managing server 102 may be coupled to a network via a wired or wireless connection. Network adapter 452 may communicate with the other components via bus 434.

Any combination of one or more computer readable media, for example, storage system 440, may be utilized. In the context of the disclosed embodiments, a computer readable storage medium may be any tangible or non-transitory medium that contains, or stores, a program, such as program product 442, for use by or in connection with an instruction execution system, apparatus, or device. A computer readable storage medium may be, for example, but not limited to, an electronic, magnetic, optical, electromagnetic, infrared, or semiconductor system, apparatus, or device, or any suitable combination of the foregoing.

In some embodiments, managing server 102 may release firmware 312, which is an upgrade to existing firmware on one or more printing devices within system 300. Firmware 312 may be forwarded to one or more printing devices through network adapter 452 when instructed by processing unit 430. Processing unit 430 may execute instructions stored in server memory 432 to configure managing server 102 to perform the steps and functions disclosed below. Specifically, instructions stored in program modules 444 may determine whether to upgrade firmware within the plurality of devices in system 300.

As illustrated in FIG. 2, information about each printing device 104-116 is stored in an entry, such as entry 130. Entry 130 may be referred by managing server 102 to control and manage print jobs sent to printing devices 104-116. The information saved in entry 130 may be updated by printing devices 104-116 sending their statuses to managing server 102 automatically, periodically, in real time, or upon request of managing server 103 or system 100. In FIG. 2, entries 130 are saved in managing server 102. Entries 130, however, may also be saved in a separate database without limitation.

FIG. 5 depicts information, but not limited to, included in an exemplary entry 130 of individual printing devices 104-118 in accordance with the preferred embodiments. It is noted that the information illustrated in FIG. 5 is for exemplary purpose. Other information about printing device status may be added as needed. Entry 130 may be created by printing system 100 and includes various information about printing devices 104-118, such as warning status, priority status, error status, firmware information, and so on. Entry 130 may be stored in a database, such as storage 440 of managing server 102. Changes of information in entry 130 can be sent to entry 130 automatically or in request by printing system to update the information of entry 130. Based on information of entry 130, managing server 102 monitors the statuses of each printing device 104-118 and controls printing job list accordingly.

Firmware information 502 includes information about firmware version, type of firmware, date of installation, and so on. In some situation, managing server 102 may update firmware to a specific printing device so that this specific printing device is capable of performing a print job sent from system 100. After a new firmware is installed in the specific printing device, the information of the firmware version, type of firmware and date of installation will also be updated.

Error history 504 records dates of error occurrences and their codes. Based on the error history, managing server 102 can decide if this specific printing device is suitable for printing a specific job. For example, on Jan. 1, 2020, an error code of paper jam occurred at a printing device after the printing device prints 100 pages of a document. Same error code of paper jam occurred again in Jan. 3, 2020. Managing server 102 thus will not direct a print job that uses more than 100 papers to this specific printing device on Jan. 5, 2020 unless such an error code has not been recorded for a certain period of time, e.g., one month. The error codes may also include toner drum errors, power-interrupted errors, and so on.

The error codes also may be correlated with an "age" of the printing devices. The age of a printing device may be indicated by a total print volume. Some devices may print up to several million pages during their lifetimes. For instance, some devices that have a low level of total print volume may be affected by specific error or failure events as compared to those devices having a high total print volume. Hardware components may start to break down to result in failure events or errors at a certain "age" or print volume. Thus, managing server 102 may receive data from the printing devices on their total print volume. Alternatively, managing server 102 may determine average print volumes for the periods used to determine failure rates and MTBFs for error codes and printing devices.

Print volume history 506 includes at least information regarding print to volume count, date of check out, etc. Those information helps managing server 102 to decide if the printing device is out-of-date to execute a specific print job.

Paper cassette information 508 includes a number (or percentage) of papers remaining in a paper cassette. There may be more than one paper cassette in a printing device. Thus, the paper cassette information 508 may include cassette number and its relative data. Other than the number (percentage) of remaining papers, paper cassette information 508 may also include information of paper sizes, paper quality, paper thickness, media type, cleanness level, paper jam information, and so on. Further, ink toner information 510 includes information relating to remaining ink level, color/black-and-white ink cartridge, etc. Managing server 102 may direct a print job that needs color and B5 paper size to a printing device that can accommodate such features based on the paper cassette information 508 and ink toner information 510 stored in entries 130. Details of how managing serve 103 directs and redirects print jobs will be described later.

According to the preferred embodiments, managing server 102 may redirect a print job that is originally sent to a first printing device to a second printing device when a warning or error signal is received from the first printing device. Warning information 512 indicates whether the printing device has a High-Priority warning, a Medium-Priority Warning, or a Low-Priority warning. Error information 514 indicates that the printing device has an Error, or a Potential Error. Different levels of warnings and errors have been described above with reference to FIG. 2 and thus no further explanations are needed here for brevity.

Entry 130 may also include priority job information 516. Priority job information 516 indicates that the job number assigned to the printing device, whether this job number is in progress, incoming job number, suspending job number, and so on. The status of each print job may be indicated.

Based on the information stored in entries 130 of printing devices 104-118, the disclosed embodiments allow a list of print jobs to be directed or redirected to suitable printing devices. For example, managing server 102 determines a print job for printing device 116 will stop printing given the situation that printing device 116 does not have enough paper in its cassette 1 based on a POTENTIAL WARNING received from printing device 116. Managing device 102 may then send a signal to a user to add more papers into cassette 1, or redirects the print job to another printing device, such as printing device 114, based on the time of the day or other conditions.

Figure 6:
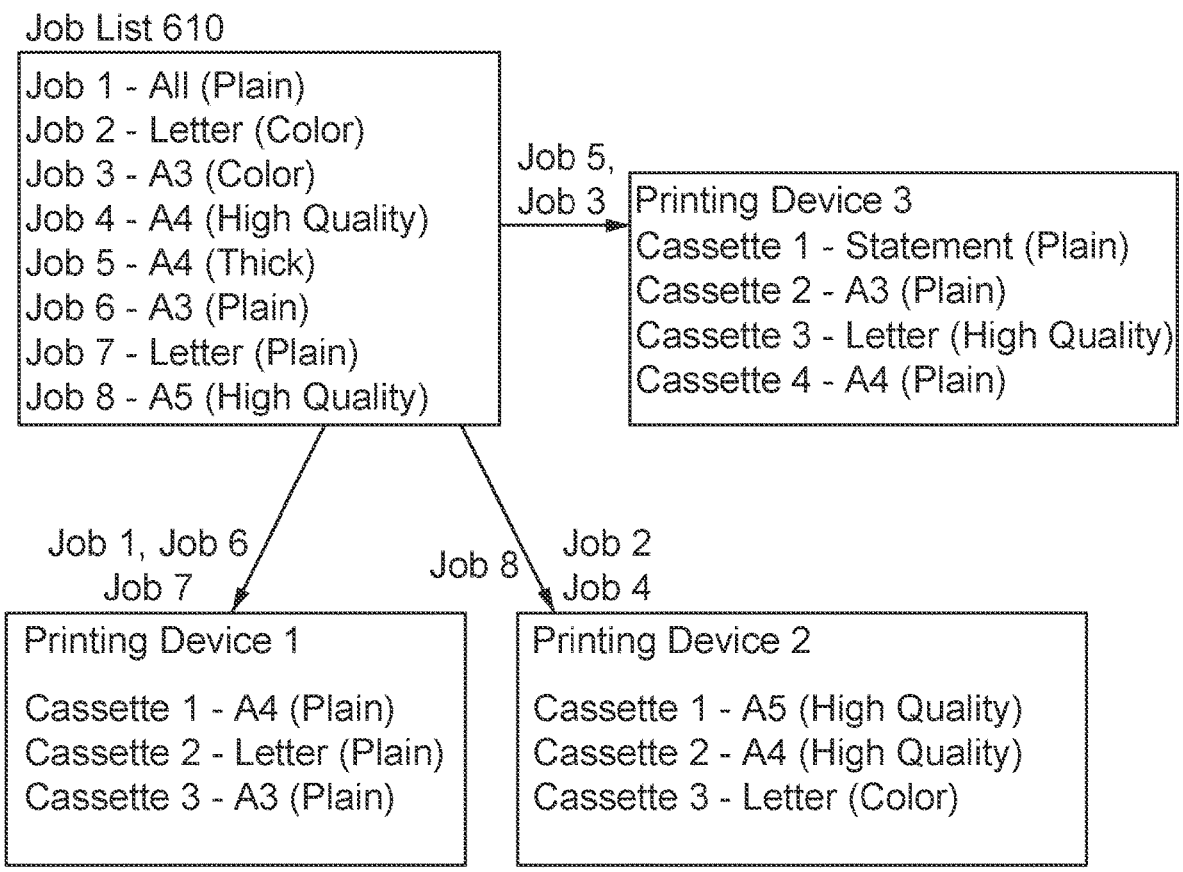
FIG. 6 illustrates a block diagram of an example print job list in which multiple print jobs are routed to a plurality of printing devices in according to the disclosed embodiments.

Examples of how managing server 102 directs and redirects print jobs to various printing devices based on entries 130 is illustrated in FIG. 6.

According to the preferred embodiments, when working on a single printing device and when errors and warnings are displayed based on resolving issues per printer, summary of inadequate resources in processing N number of jobs for the printer may be sent to entries 130 of this printing device. In response, managing device may send the information to a user of the printing device so that the user can work on replenishing the resources to process N number of jobs, i.e., not just mitigating the obvious error reported for the current job as can already be seen in the printing device's display panel. This in effect avoids repetitive interruption on the printing device. It also gives the user the option to make the most out of interruption.

When working on multiple devices, such as printing devices 104-118 of FIG. 2, the whole fleet of printing devices in the user's location may be theoretically considered as one big printing device. Inadequate resources for printing the queued print jobs, despite having multiple printers, is still identified. When a printing device needs user attention, the display of errors and warnings can again summarize all lacking resources (sorted based on job order) to process the print jobs, and user can "refill" those resources to resolve one or more print job resource/media needs. Alternatively, managing server 102 may re-direct some print jobs to other suitable printing devices. This is particularly important when the errors or warnings occur at time when the user is not working.

FIG. 6 illustrates an exemplary diagram for routing jobs of a print job list in accordance with the preferred embodiments. In FIG. 6, printing devices 1-3 are used to execute print jobs shown in job list 610. Printing device 1 has three paper cassettes: cassette 1 has plain A4 size papers, cassette 2 has plain letter size papers, and cassette 3 has plain A3 size papers. Printing device 2 also contains three cassettes: cassette 1 has high quality A5 size papers, cassette 2 has high quality A4 size papers, and cassette 3 has colored letter sized paper. In printing device 3, cassette 1 has plain statement size papers, cassette 2 has plain A3 size papers, cassette 3 has high quality letter size paper, and cassette 4 has plain A4 papers. The jobs in job list 610 includes Jobs 1-8. Job 1 requires plain A4 size papers. Job 2 requires printing on letter size papers and colored. Job 3 requires A3 size papers and colored. Job 4 requires high quality A4 paper. Job 5 requires thick A4 papers. Job 6 requires A3 size plain papers. Job 7 requires plain letter size papers, and Job 8 requires high quality A5 size papers.

As shown in FIG. 6, Jobs 1, 6, and 7 are sent to printing device 1, Jobs 2, 4, and 8 are sent to printing device 2, and Jobs 3 and 5 are sent to printing device 3 for processing. As printing device 3 does not have A3 color paper in its cassettes, "Load A3 Color" instructions will be displayed on its display panel. Also, since system 100 knows that Job 5 cannot be printed in printing devices 1 and 2, system 100 will suggest printing device 3 for Job 5 as it has "unused" cassette (cassette 1) that can be changed to feed A4 thick papers. Accordingly, printing devices 1 and 2 are able to execute printing jobs sent to them without interruption. Jobs 3 and 5 can be printed with only one interruption.

The disclosed preferred embodiments also allow managing server 102 to receive update information from printing devices 1-3, such as the amount of the papers in cassette 1 of printing device 1 is running low (for example, a POTENTIAL ERROR, ERROR, HIGH-PRIORITY WARNING, MEDIUM-PRIORITY WARNING, or a LOW-PRIORITY WARNING, based on the respective settings.) In this case, managing server 102 may send a notification to the user to load more A4 size plain papers, or redirect Jobs 1 to printing device 3. Managing server 102 may again re-direct Job 1 back to printing device 1 when the papers in cassette 4 of printing device 1 are also running low and more papers in cassette 1 of printing device 1 have been loaded. This determination may be performed for all pending print jobs 1-8 in print job list 610. The evaluation of a particular queued print job may take into account resources that will be consumed by all ahead-of-the-line queued print jobs to foresee if it will cause an error. When a new status update is received from a printing device, the list of pending print jobs or orders, which has information already on their needed resources, may be reevaluated to determine if the new status will cause an error or a warning.

Further, if queued print jobs 1-8 will cause an error or warning, the priority of the new error or warning also is determined. The priority of error or warnings may rank these items using the error categories disclosed in FIG. 2. These error categories may differ between printing systems. Printing system 100 or managing server 102 may determine a priority of errors and warnings across all printing devices as well as within each printing device. Thus, printing system 100 may analyze print job list 610 on all printing devices. The errors and warnings also may be prioritized based on print job order. In a preferred embodiment, the errors and warnings may be sent to managing server 102 and saved in respective device information entries 130.

History data gathered from device statuses can also be used as additional information for managing server 102 to determine routing decisions. For example, printing device 1 has 20% chance of paper jam when processing A4 Thick media types, while printing device 2 has 5% chance of paper jam for A4 Thick media types. Accordingly, when a print job of A4 Thick media types is requested, system 100 or managing server 102 will suggest printing device 2 to load A4 Thick papers and direct the print job to printing device 2 instead of printing device 1.

Firmware information stored in entry 130 can also be used to determine where a print job to route to. For example, when a firmware version/type of printing device 2 is an old version that cannot process Job 4, managing server 102 may download an updated firmware to printing device 2 or redirect Job 4 to other capable printing device.

Figure 7:
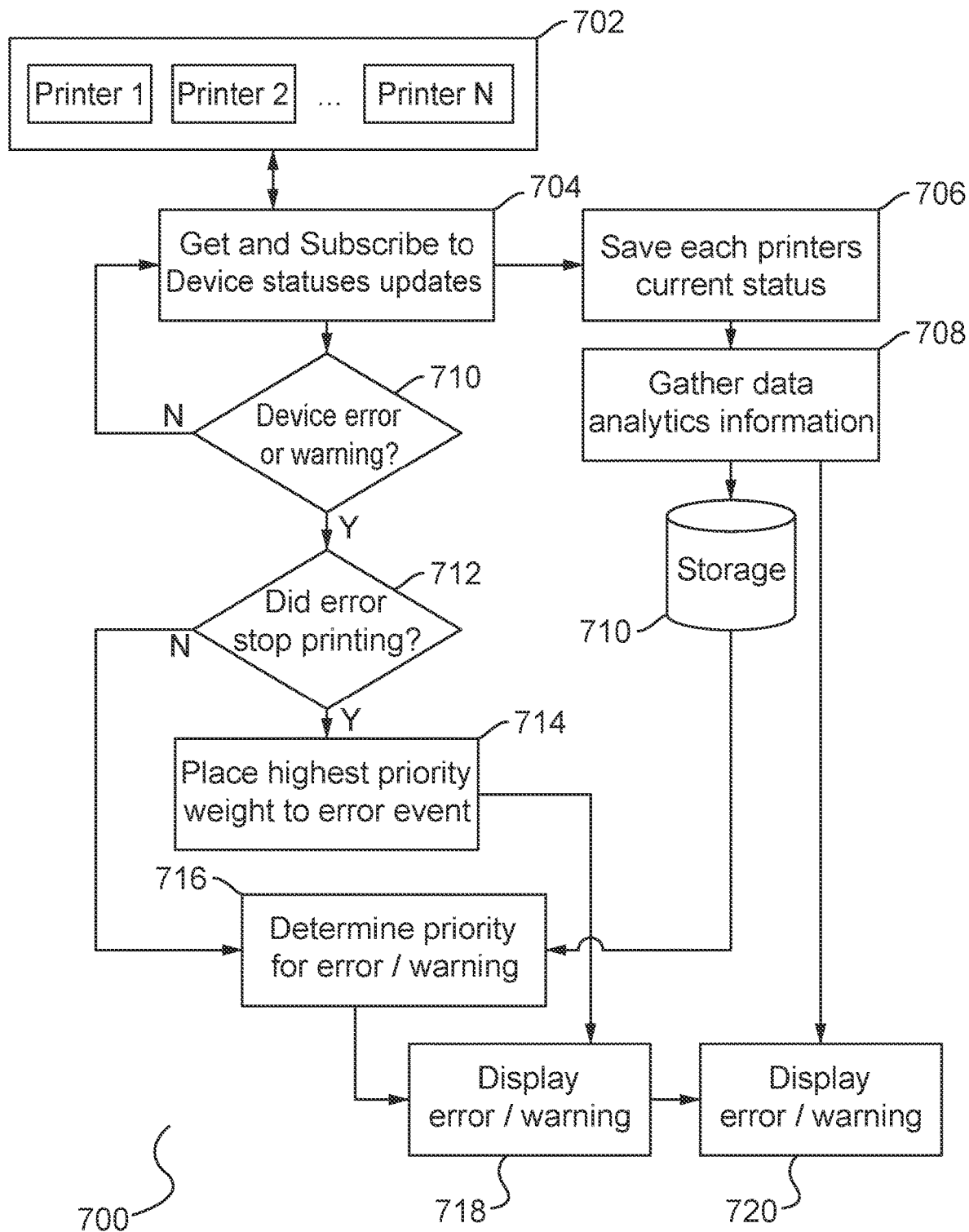
FIG. 7 illustrates a flowchart of determining resources needed to perform print jobs in a print job list according to the disclosed embodiments.
Figure 8:
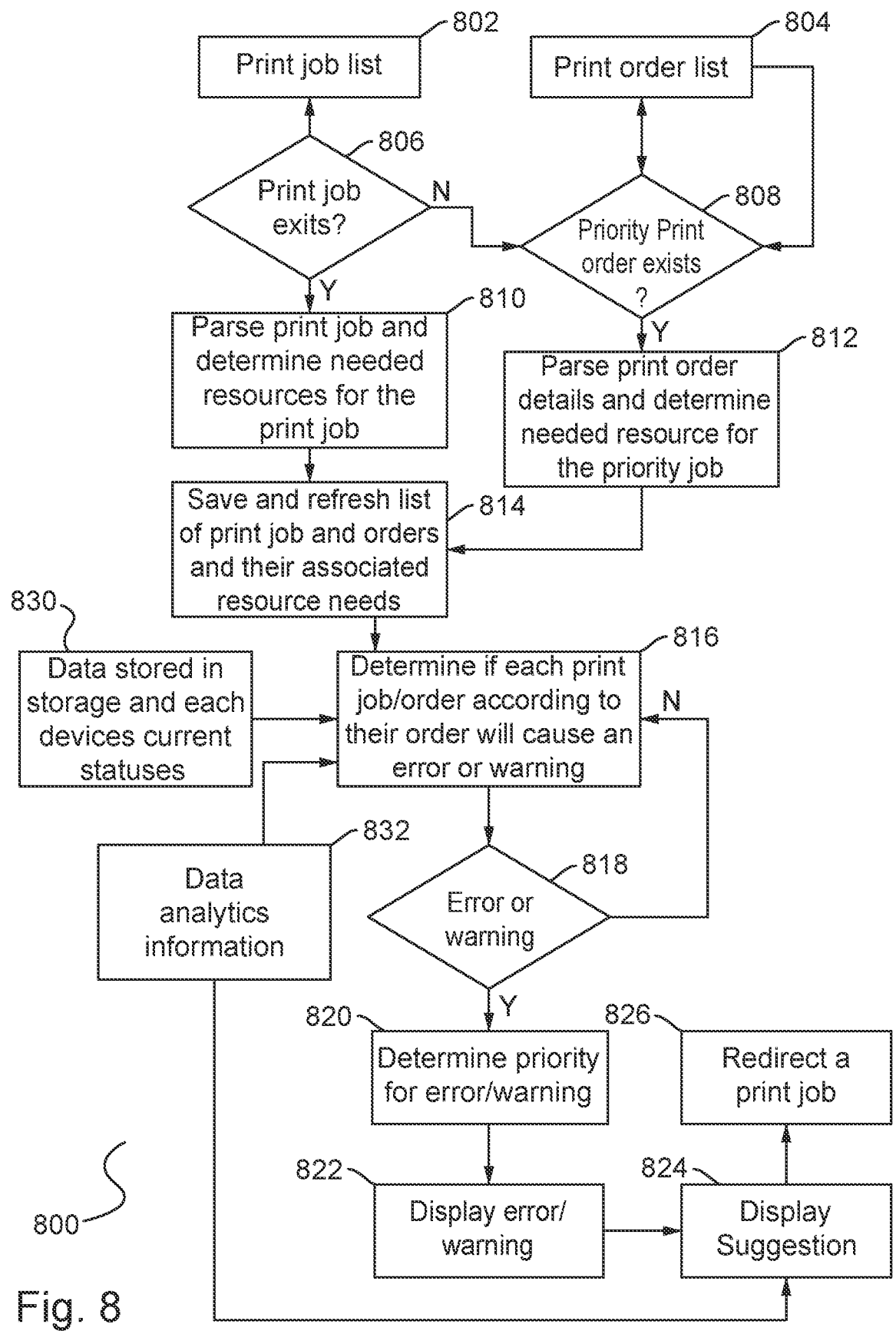
FIG. 8 illustrates a flowchart of managing a print job list and print job orders in a printing system according to the disclosed embodiments.

FIGS. 7-9 depict flowcharts for determining print job resources based on statuses of multiple printing devices in accordance with the disclosed embodiments. FIG. 7 depicts a block diagram for prioritizing status information collected from multiple printing devices in accordance with the disclosed embodiment. FIG. 8 depicts a block diagram for managing print jobs sent to multiple printing devices based on statuses information collected from the multiple printing devices. FIG. 9 depicts a block diagram for managing a print job list sent to multiple printing devices in accordance with the disclosed embodiments.

FIG. 7 depicts a flowchart 700 for prioritizing status information collected from a multiple of printing devices in accordance with the disclosed embodiment. Printing system 702 comprises a multiple of printing devices 1, 2, . . . , N for executing a list of print jobs. Printing system 702 may be printing system 100 of FIGS. 1-2 and printing devices 1, 2, . . . , N may be printing device 104-118 of FIGS. 1-3.

Step 702 executes by printing system 100 or managing server 102 (shown in FIGS. 1-4) collecting information of each of printing devices 1, 2, . . . , N including device status updates. As described above, printing system 100, using managing server 102 or another device, may query all the managed printing devices for paper cassette statuses or other halting errors. The printing devices may also subscribe to send status changes for paper cassettes and device errors. Information gathered by printing system 100 may include information on pending print jobs for each printing device, such as paper sizes used, number of pages in the pending print jobs, number of copies, media types used, and the like, and information on pending job orders not yet being printed. The information may further include historical, or data analyses, information, such as paper sizes and media types used whether for printing or waste-like jams, time to replenish paper cassettes, time to consume toner, cleaning fluid, and the like, time for a waste bottle to be replaced, and the like. All the above information gathered by printing system 100 are saved in respective entry of each printing device in storage 710.

Steps 706 and 708 execute by saving current statuses of each printing device 1, 2, . . . , N and gathering and saving data analytics information obtained based on the current statuses to storage 710. Storage 710 may be memory 206 of printing system 100 or storage system 440 of managing server 102, or a separate database. Information related to each printing devices 1, 2, . . . , N is stored in their respective entries (such as entries 130). Printing system 100 or managing server 102, by referring to information saved in the entries, determine or foresee print job list orders that make best use of resources with minimum interruption.

The status updates of each printing device may be sent to printing system in real time or by request. Upon receiving the status updates of each of printing devices 1, 2, . . . , N at step 704, printing system 100 or managing server 102 determines if the status updates of a printing device will result in device errors or warnings for this printing device, as executed at step 710. Types of device errors and warnings and their priority levels have been described in the preferred embodiments of FIG. 2, and detailed descriptions thereof are omitted for brevity. If the answer is Yes, step 712 executes by determining if the device errors or warnings will cause this printing devices to stop functioning.

If the answer of step 712 is Yes, step 714 executes by placing the device errors and warnings at highest priority weight. If the answer of step 812 is No, the process goes to step 716 for determining priority of the device errors/warnings. Step 718 executes by displaying an error/warning notice on a display panel of the printing devices. Next, step 720 executes by printing system 100 or managing server 102 determining best suggestions based on data analytics information obtained at step 708 and displaying such suggestions on the display panel of the printing device.

FIG. 8 depicts a flowchart 800 for determining suitable resources for performing print jobs in a print job list and a print order list in accordance with the preferred embodiments. When a print job list 802 and a print order list 804 are presented, printing system 100 or managing server 102 determines if any print jobs exist in the print job list 802, at step 806, and any priority print order exists in print order list 804, at step 808.

At step 806, if there is no print job existed in print job list, printing system 100 or managing server 102 determines if any priority print orders are existed in print order list 804. When there are print jobs existed in print job list 802, step 810 executes by printing system 100 or managing server 102 parsing print jobs and determining suitable sources for the print jobs. In accordance with the preferred embodiments, printing system 100 or managing server 102 may refer to information stored in storage 710 and current statuses of the printing devices at step 830 to decide which printing devices are needed resources for executing the print jobs. Similarly, when there is priority print order exists at step 808, step 812 executes by printing system 100 or managing server 102 parsing print jobs in the print order and determining which printing devices are needed resources for executing the print jobs based on information stored in storage 710 and the current statuses of the printing devices.

Step 814 executes by printing system 100 or managing server 102 saving and refreshing the list of print jobs and their associated resource needs after the determinations at steps 810 and 812 are made. Next, step 816 executes by printing system 100 or managing serve 102 determining if each print job/order according to their order will cause an error or a warning by referring data analytics information 832 obtained by analyzing information saved in storage 710 and the current statuses of the printing devices.

At step 818, if the print job/order will cause an error or a warning, step 818 executes by determining a priority of the error/warning. Step 820 executes by displaying such an error/warning on a display panel of a related printing device. Further, step 822 executes by printing system 100 or managing server 102 making suggestions on how to solve the error/warning, based on data analytics information 832, and displaying such suggestions on the display panel of the related printing device. In some preferred embodiments, printing system 100 or managing server 102 may further redirect the print job that will cause an error or warning for a first printing device to a second printing device that can accommodate this print job, as shown at step 826.

FIG. 9 depicts a flowchart 900 for redirecting a print job to a suitable printing device in accordance with the preferred embodiments.

Step 902 executes by printing system 100 receiving a print job list. Step 904 executes by printing system 100 parsing print jobs in the print job list and determining needed resources for individual print job. The determination may be evaluated based on information saved in entries 130 of the printing devices that are stored in storage 710. After the determination of needed resources is made, step 906 executes by printing system 100 or managing sever 102 saving and refreshing the print job list and order of the print jobs.

As described above with reference to FIG. 2, the current status updates of the printing devices may be sent to printing system 100 or managing server 102 upon request or in subscription. Printing system 100 may establish a subscription 134 (see FIG. 2) on each printing device for device and print job statuses. Subscription 134 may provide updates and information to managing server 102. When a status change occurs for the printing device or print jobs, the applicable printing device sends a notification 136 (in FIG. 2) to printing system 100.

Step 908 executes of printing system 100 or managing server 102 receiving a notification of an applicable printing device. The notification may include, for example, referring to printing device 116, the status of paper cassette 1 may change from low paper to empty cassette. Printing device 116 sends notification 136 to this effect. Step 910 then executes by printing system 100 or managing server 102 evaluating such a notification and saving the current information in entry 130 for information for printing device 116 on managing server 102. Printing system 100 also may create historical data for printing device 116 that will be used for data analytics.

Step 912 executes of printing system 100 or managing server determining if the notification received from an applicable printing device will cause an error or warning. If the answer is Yes, next step 914 executes of printing system 100 or managing server determining whether the error/warning will cause or has caused the device to stop printing. If the answer is Yes, step 916 may escalate this notification as a highest priority error.

If the error/warning will not or has not caused the device to stop printing, step 918 executes of printing system 100 or managing sever 102 determining priority level of the error/warning. Different priority levels have been described above with reference to FIG. 2.

Next, step 922 executes by displaying the error/warning on a display panel of the applicable printing device and step 924 executes by displaying suggestions on a display panel of the applicable printing device. Taking printing device 116 as an example, when the notification indicates that the status of paper cassette 1 may change from low paper to empty cassette, the displayed suggestions may include loading more papers on cassette 1.

Alternatively, step 920 executes by printing system 100 or managing server 102 redirecting the print job to a different printing device. According to the preferred embodiments, printing system 100 or managing server 102 may redirect a print job that will cause or has caused a printing device to a different printing device when applicable situations occur. Exemplary applicable situations may include those when the printing job is performed at night when users are not near the printing device, when there are no suitable papers to be loaded in the paper cassette, when there are no more toners, or when the printing device is out of order, and so on. The determination of the different printing device may be made based on current status updates saved in individual entry 130 and data analytics information gathered from the current status updates and historic data of each printing device. The information of entry 130 have been described above with reference to FIG. 5.

An alternative embodiment includes a method for resolving errors within a printing system is further disclosed. The method includes compiling error information about errors from a plurality of printing devices, compiling pending job information for pending print jobs at the plurality of printing devices, analyzing the error information about the errors from the plurality of printing devices, determining an error category for each of the errors based on the error information, applying weight parameters to each of the errors according to the respective error category, analyzing the pending job information for the pending print jobs at the plurality of printing devices to determine resources specified by each pending print job, indicating that the resources specified by each pending print job will result in a potential error at a printing device of the plurality of printing devices, applying the weight parameters to the potential error, and determining a priority order to resolve the errors and the potential error based on the weight parameters and the pending job information for the pending print jobs.

A further alternative embodiment recites a method for resolving errors at a printing device is also disclosed. The method includes compiling error information about a plurality of errors, compiling pending job information for pending print jobs at a print queue, analyzing the error information about the plurality of errors, determining an error category for each of the errors based on the error information, applying weight parameters to each of the errors according to the respective priority category, analyzing the pending job information for the pending print jobs to determine resources specified by each pending print job, indicating that the resources specified by each pending print job will result in a potential error within the printing device, applying the weight parameters to the potential error, and determining a priority order to resolve the errors and the potential error based on the weight parameters.

A yet alternative embodiment includes a print managing server for a printing system is yet disclosed. The print management server includes a processor and a memory to store instructions executable on the processor. According to the embodiment, the instructions, when executed, configure the server to compile error information about errors from a plurality of printing devices, compile pending job information for pending print jobs at the plurality of printing devices, analyze the error information about the errors from the plurality of printing devices, determine an error category for each of the errors based on the error information, apply weight parameters to each of the errors according to the respective priority category, analyze the job information for the pending print jobs at the plurality of printing devices to determine resources for each pending print job, indicate that the resources for each pending print job will result in a potential error at the respective printing device, apply the weight parameters to the potential error, and determine a priority order to resolve the errors and the potential error based on the weight parameters and the job information for the pending print jobs.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operations, elements, components, and/or groups thereof.

Embodiments may be implemented as a computer process, a computing system or as an article of manufacture such as a computer program product of computer readable media. The computer program product may be a computer storage medium readable by a computer system and encoding a computer program instructions for executing a computer process. When accessed, the instructions cause a processor to enable other components to perform the functions disclosed above.

The corresponding structures, material, acts, and equivalents of all means or steps plus function elements in the claims below are intended to include any structure, material or act for performing the function in combination with other claimed elements are specifically claimed. The description of the present invention has been presented for purposes of illustration and description, but is not intended to be exhaustive or limited to the invention in the form disclosed. Many modifications and variations will be apparent to those of ordinary skill without departing from the scope and spirit of the invention. The embodiment was chosen and described in order to best explain the principles of the invention and the practical application, and to enable others of ordinary skill in the art to understand the invention for embodiments with various modifications as are suited to the particular use contemplated.

One or more portions of the disclosed networks or systems may be distributed across one or more MFP systems coupled to a network capable of exchanging information and data. Various functions and components of the MFP system may be distributed across multiple client computer platforms, or configured to perform tasks as part of a distributed system. These components may be executable, intermediate or interpreted code that communicates over the network using a protocol. The components may have specified addresses or other designators to identify the components within the network.

It will be apparent to those skilled in the art that various modifications to the disclosed may be made without departing from the spirit or scope of the invention. Thus, it is intended that the present invention covers the modifications and variations disclosed above provided that these changes come within the scope of the claims and their equivalents.

What is claimed is:

1. A method for managing a plurality of printing devices within a printing system, the method comprising:
    receiving device information for each of the plurality of printing devices, wherein the device information includes status of components within each of the printing devices;
    subscribing to receive device update status information and pending job information from each of the plurality of printing devices, wherein the device update status information and pending job information is stored with the device information for each of the plurality of printing devices;
    assigning error categories for the status information of each of the plurality of printing devices, wherein the error categories includes errors and warnings;
    assigning print jobs of a list of print jobs to the plurality of printing devices based on the status information of each of the plurality of printing devices;
    detecting a status change for one of the components within a first printing device of the plurality of printing devices;
    updating the device information for the first printing device;
    parsing a print job queue for the first printing device to update the pending job information, wherein at least one print job in the print job queue will change a status of the first printing device;
    determining the at least one print job will cause a first potential error related to the changed status of the first printing device;
    re-assigning a priority to the first potential error based on the error categories preset by a managing server within the printing system after updating the device information for the first printing device;
    receiving a new print job for the printing system;
    determining that the new print job will not occur according to the first potential error at the first printing device based on the device information, device update status information, or pending job information of the first printing device;
    identifying a second printing device of the plurality of printing devices;
    determining the new print job will not result in a second potential error at the second printing device based on its device information, device update status information, and pending job information of the second printing device; and
    sending the new print job to the second printing device, wherein the priority is re-assigned when the status information of the plurality of printing devices are updated, and when determining the print job will cause the potential error.

2. The method of claim 1, further comprising sending a notification regarding the first potential error at the first printing device.

3. The method of claim 1, further comprising determining a warning status for the first printing device based on the at least one print job in the print job queue and the resource or the component.

4. The method of claim 3, further comprising applying a threshold to the warning status to determine a presence of the first potential error in the first printing device, wherein the threshold is pre-determined by the managing server within the printing system.

5. The method of claim 3, further comprising identifying the second printing device based on the device information and the job information for the new print job.

6. The method of claim 1, further comprising determining a print-halting category for the first potential error in the first printing device.

7. The method of claim 6, further comprising initiating a fix of the first potential error in the first printing device based on the print-halting category.

8. The method of claim 1, further comprising:
    determining the at least one print job will not result in the second potential error at the second printing device based on its device information, device update status information, and pending job information of the second printing device; and
    redirect the at least one print job to the second printing device with intervention from a user.

9. A method of managing print jobs using a plurality of printing devices, the method comprising:
    obtaining from each printing device of the plurality of printing devices job information about one or more print jobs pending at the printing device, error information about one or more errors on the printing device, warning information about one or more warnings on the printing device, and function information about one or more functions available at the printing device;

determining an error priority order of the plurality of printing devices based on the error information and the warning information, wherein the error priority order is determined based on error categories preset by a managing server of the plurality of printing devices, wherein the error categories include Error, Potential Errors, High-Priority Warning, Medium-Priority Warning, and Low-Priority Warning;

receiving a print job of a document, wherein the print job specifies resources needed to complete printing of the document;

determining the resources for the print job will cause an error condition at one or more printing devices of the plurality of printing devices using the job information, and wherein the error condition is determined by the error categories, and a threshold pre-determined by the managing server of the plurality of printing devices is applied to the error categories to determine a presence of the error condition;

updating the error priority order based on the error condition at the one or more printing devices after determining the resources for the print job will cause an error condition at one or more printing devices of the plurality of printing devices;

determining a printing device from the plurality of printing devices to receive the print job of the document according to the function information of each printing device and the error priority order, wherein the printing device processes the print job without causing the error condition;

sending the print job to the printing device;

updating the job information for the printing device, and re-determining and updating the error priority order after sending the print job to the printing device.

10. The method of claim 9, further comprising modifying the error priority order for the plurality of printing devices using historical data of each printing device.

11. The method of claim 9, further comprising querying each of the plurality of printing devices for the job information, the error information, the warning information, and the function information from each of the respective printing device.

12. The method of claim 9, wherein the job information for each of the plurality of printing devices includes a print job queue having at least one pending print job for processing at the respective printing device.

13. The method of claim 12, further comprising parsing the at least one pending print job at each of the plurality of printing devices.

14. The method of claim 13, further comprising determining needed resources specified by the at least one pending print job in the print job queue at each of the plurality of printing devices.

15. The method of claim 14, further comprising determining that using the needed resources for the at least on pending print job in the print job queue at each of the plurality of printing devices will cause the error condition based on the print job of the document.

16. A method for processing a print job for a document, the method comprising:

querying a first printing device of a plurality of printing devices for first job information about at least one pending print job in a first print queue, first error information about at least one error on the first printing device, and first function information about at least one function available at the first printing device;

querying a second printing device of the plurality of printing devices for second job information about at least one pending print job in a second print queue, second error information about at least one error on the second printing device, and second function information about at least one function available at the second printing device;

analyzing the first error information and the second error information to prioritize the at least one error on each of the first and second printing devices, wherein prioritizing the at least one error on each of the first and second printing devices is determined by error categories preset by a managing server connecting with the first and second printing devices and a threshold pre-determined by the managing server is applied to the error categories to determine a presence of the at least one error on each of the first and second printing devices;

determining an error priority order between the first and second printing devices;

receiving the print job of a document, wherein the print job specifies resources to complete printing of the document;

determining whether the resources specified by the print job will cause a first potential error condition on the first printing device based on the first job information;

determining whether the resources of the print job will cause a second potential error condition of the second printing device based on the second job information;

updating the error priority order based on the first potential error condition and the second potential error condition caused by the print job;

sending the print job to one of the first printing device and the second printing device based on the error priority order and the function information for each printing device, wherein the method further includes collecting status information of the first and second printing devices, updating the error priority order based on changes of the collected status information, and re-updating the error priority order after the print job is sent to one of the first and second printing devices for execution.

17. The method of claim 16, further comprising parsing the at least one pending print job in the first print queue to determine the first job information and parsing the at least one pending print job in the second print queue to determine the second job information.

18. The method of claim 16 further comprising compiling first data analytics for the first printing device and compiling second data analytics for the second printing device.

19. The method of claim 18, wherein determining whether the resources specified by the print job will cause the first potential error condition includes applying the first data analytics for the first printing device.

20. The method of claim 18, wherein determining whether the resources specified by the print job will cause the second potential error condition includes applying the second data analytics for the second printing device.

* * * * *